(12) United States Patent
Cardwell et al.

(10) Patent No.: US 7,410,205 B2
(45) Date of Patent: Aug. 12, 2008

(54) RETRACTABLE PATIO ASSEMBLY FOR A RECREATIONAL VEHICLE

(76) Inventors: Randy C. Cardwell, 1510 Popular Spruce Rd., Ware Shoals, SC (US) 29692; David Kajdi, 101 Twisted Oak Dr., Greenwood, SC (US) 29646

( * ) Notice: Subject to any disclaimer, the term of this patent is extended or adjusted under 35 U.S.C. 154(b) by 293 days.

(21) Appl. No.: 11/154,036

(22) Filed: Jun. 16, 2005

(65) Prior Publication Data
US 2006/0145514 A1    Jul. 6, 2006

Related U.S. Application Data

(60) Provisional application No. 60/641,493, filed on Jan. 4, 2005.

(51) Int. Cl.
*B60P 3/37*    (2006.01)
(52) U.S. Cl. ..................................... 296/162
(58) Field of Classification Search ................. 296/156, 296/162, 26.12
See application file for complete search history.

(56) References Cited

U.S. PATENT DOCUMENTS

| | | | |
|---|---|---|---|
| 3,392,990 A | 7/1968 | Wolf | |
| 3,515,406 A | 6/1970 | Endsley, Jr. | |
| 3,796,456 A * | 3/1974 | Bergeson et al. | 296/156 |
| 3,997,211 A | 12/1976 | Graves | |
| 4,264,084 A * | 4/1981 | Telles | 280/166 |
| 4,413,855 A * | 11/1983 | Flanagan | 296/162 |
| 4,720,116 A * | 1/1988 | Williams et al. | 280/166 |
| 4,723,744 A | 2/1988 | Baker, Jr. et al. | |
| 4,869,030 A * | 9/1989 | Clark | 52/79.6 |
| 4,883,306 A * | 11/1989 | Stucky | 296/162 |
| 5,876,051 A * | 3/1999 | Sage, Sr. | 280/166 |
| 5,899,518 A * | 5/1999 | Schreiner | 296/26.01 |
| 5,997,073 A * | 12/1999 | Vanderhoof | 296/162 |
| 6,393,769 B1 * | 5/2002 | Mertik et al. | 52/7 |
| 6,502,893 B1 * | 1/2003 | Corliss, Jr. | 296/162 |
| 6,779,833 B2 * | 8/2004 | Benz et al. | 296/162 |
| 6,869,092 B1 * | 3/2005 | Henn | 280/166 |
| 7,093,888 B2 * | 8/2006 | Anderson et al. | 296/162 |
| 7,188,842 B2 * | 3/2007 | Thorpe | 280/6.153 |
| 2004/0056510 A1 * | 3/2004 | Benz et al. | 296/162 |
| 2004/0094983 A1 * | 5/2004 | Bortell | 296/26.12 |
| 2005/0231003 A1 * | 10/2005 | Rehkopf | 296/162 |
| 2006/0006693 A1 * | 1/2006 | Anderson et al. | 296/162 |
| 2006/0145514 A1 * | 7/2006 | Cardwell et al. | 296/162 |
| 2007/0187989 A1 * | 8/2007 | Brown et al. | 296/162 |

* cited by examiner

*Primary Examiner*—H Gutman
(74) *Attorney, Agent, or Firm*—James Ray & Assoc.

(57) ABSTRACT

A retractable patio assembly for a recreational vehicle has a platform member pivotally attached to a wall structure of the recreational vehicle and pivotable between a stored and an extended position. Attachment to the wall structure enables adjustable vertical movement of a rear edge of such patio assembly. A pair of adjustable supports are provided at a front edge. In another embodiment, the patio assembly is received within a pair of laterally spaced track members for storage under the recreational vehicle.

9 Claims, 2 Drawing Sheets

RETRACTABLE PATIO ASSEMBLY FOR A RECREATIONAL VEHICLE

CROSS-REFERENCE TO RELATED APPLICATIONS

This application is related to and claims priority from U.S. Provisional Patent Application Ser. No. 60/641,493 filed on Jan. 4, 2005.

FIELD OF THE INVENTION

The present invention relates, in general, to an accessory for a recreational vehicle and, more particularly, the invention relates to a retractable patio assembly for a recreational vehicle such as a camper, mobile home, motor home, fifth wheel RV and the like.

BACKGROUND OF THE INVENTION

People use recreational vehicles having ground engaging wheels such as campers, motor homes and the like for travel and work purposes and many live in such vehicles throughout the entire year.

As is generally well known, such recreational vehicles are often parked on less than desirable ground surfaces which become wet and muddy during rainy weather. While awnings are commonplace on campers, mobile homes, motor homes and fifth wheel RVs, they offer limited protection from such ground condition, particularly, in preventing people from carrying dirt, mud and debris into the vehicle.

Furthermore, the ground surface that the vehicle must park on may not be leveled causing difficulties in placing and using outdoor cooking devices and outdoor furniture.

Additionally, difficulties exist for disabled people to ingress and egress such recreational vehicle as well as to comfortably enjoy its surrounding outdoor environment.

Attempts have been made to compensate for undesirable ground conditions. For example, U.S. Pat. No. 3,997,211 to Craves teaches a pivotal patio assembly for a pick-up truck mounted camper that is secured to the camper wall adjacent the door frame in a stowed condition and laterally slides under the door frame in a retracted position.

U.S. Pat. No. 3,515,406 to Endsley, Jr. and U.S. Pat. No. 3,796,456 to Bergeson et al. teach a patio assembly for a pick-up truck mounted camper that is mounted for sliding engagement under the rear portion of the camper body to slide thereunder in a position of non-use.

U.S. Pat. No. 4,188,057 to Pauli teaches a retractable patio assembly for a recreational vehicle having ground engaging wheels which is pivotable to a stowed position parallel to a vehicle wall and laterally displaced from the use position to allow free door access. A complex movable pair of leg members is provided to compensate for sloping or uneven ground surfaces, however, the design does not compensate for the vehicle being affected by such slopped or uneven ground.

U.S. Pat. No. 5,040,467 to King teaches a hinged modular patio assembly that is mounted for sliding engagement under the recreational vehicle having ground engaging wheels. A pair of inclined roller tracks is provided in the support members attached to the under surface. The patio platform has a means attached to each end of the rear to carry a roller which engages such inclined roller track.

U.S. Pat. No. 5,193,878 to Weaver teaches a hinged modular patio assembly mounted for sliding engagement beneath the recreational vehicle during transport. The ramp is moved between the stowed and deployed position by a belt and pulley system powered by a reversible motor. In deployed position the platform is disposed flush against the ground surface. A ramp is provided for wheelchair access to the platform.

While the patio assemblies presently in use provide some protection from the undesirable ground condition, they fail adequately to address compensation from sloped or uneven ground surface conditions.

Therefore, there is a need for an improved patio assembly for a recreational vehicle that addresses the aforementioned disadvantages.

SUMMARY OF THE INVENTION

In a first aspect, the present invention provides a retractable patio assembly for a recreational vehicle such as a camper, mobile home, motor home, fifth wheel RV and the like. The recreational vehicle has a wall structure with an access door and an under structure. The retractable patio assembly includes a mounting assembly having a first member engageable with a predetermined portion of the wall structure. A platform having one each of a predetermined size and a predetermined shape, a top surface, a front edge, an opposed rear edge and a pair of parallel side edges joining respectively opposed ends of the front edge and the rear edge. The platform pivotally engages a second member of the mounting assembly adjacent the rear edge, whereby the platform is selectively pivotable between a substantially vertical position adjacent the wall structure and a substantially horizontal position for use adjacent a ground surface, and whereby the mounting assembly enables substantially linear movement of the rear edge in a vertical direction for positioning it at a preselected distance from the ground surface. The mounting assembly further includes a plurality of aligned apertures disposed within the first and second members and a locking pin engaging these apertures for securing the rear edge of the platform at the preselected distance from the ground surface. A latch assembly is attached to the wall structure for securely retaining the platform in the substantially vertical position alongside the access door. A pair of support legs each pivotally attached to a bottom surface of the platform adjacent each end of the front edge and pivotally movable between a first position wherein the each support leg is outwardly extending from the platform for engagement with the ground surface and a second position wherein the each support leg is disposed along the bottom surface. A second platform may be attached with a well known hinge or the side edges of the first platform may be extended to form a pair of tracks for receiving the second platform and enabling movement thereof between a first stored position alongside one of the top surface and a bottom surface of the first platform and a second extended position wherein a rear edge of the second platform is disposed adjacent the front edge of the first platform.

In a second aspect, the present invention provides a retractable patio assembly having a pair of substantially parallel and laterally spaced elongated track members rigidly attached to the under structure, each track having a horizontally disposed flange portion and a vertically disposed wall portion. A platform having one each of a predetermined size and a predetermined shape, a top surface, a front edge, an opposed rear edge and a pair of parallel side edges joining respectively opposed ends of the front edge and the rear edge, each of the pair of side edges engaging a respective one of the pair of the elongated track members for enabling movement of the platform between a stored position wherein the platform is disposed substantially under the under structure and an extended position wherein the platform is at least partially extended past the wall structure. At least one roller attached to a predetermined portion of each track member engages a bottom surface of the platform for reducing frictional forces during movement of the platform between the stored position and the extended position. Alternatively, members manufactured from a polymer having a low coefficient of friction may be used for reducing frictional forces.

OBJECTS OF THE INVENTION

It is, therefore, one of the primary objects of the present invention to provide a retractable patio assembly for a recreational vehicle such as a motor home, camper, mobile home, fifth wheel RV and the like.

Another object of the present invention is to provide a retractable patio assembly for a recreational vehicle which provides protection from wet and muddy ground surfaces.

Yet another object of the present invention is to provide a retractable patio assembly for a recreational vehicle which is suitable for use on uneven ground surfaces.

A further object of the present invention is to provide a retractable patio assembly for a recreational vehicle which is accessible by a disabled or handicapped person.

An additional object of the present invention is to provide a retractable patio assembly for a recreational vehicle which is easy to use.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
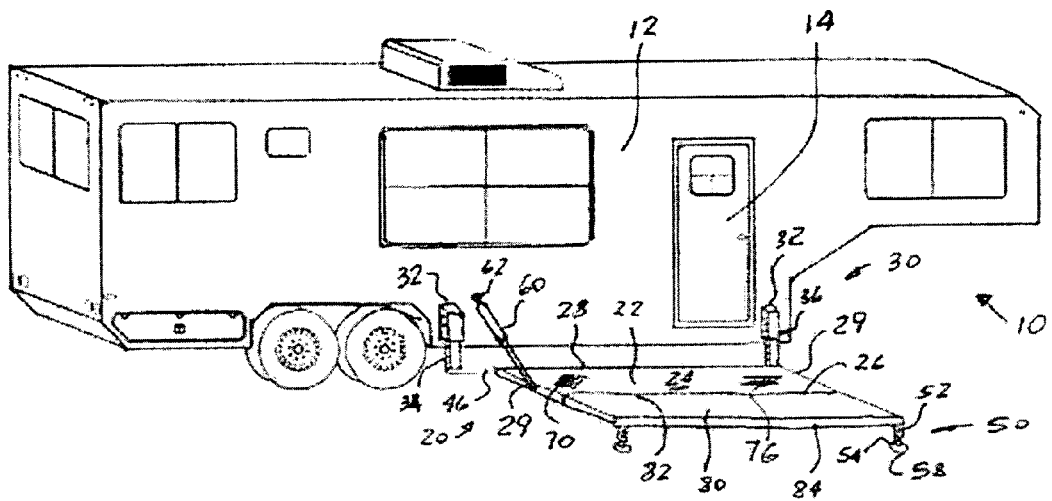
FIG. 1 is a perspective view of a retractable patio assembly constructed according to a first embodiment of the present invention, particularly showing such retractable patio assembly in an extended position.

Prior to proceeding to the more detailed description of the present invention, it should be noted that, for the sake of clarity and understanding, identical components which have identical functions have been identified with identical reference numerals throughout the several views illustrated in the drawing figures.

Figure 2:
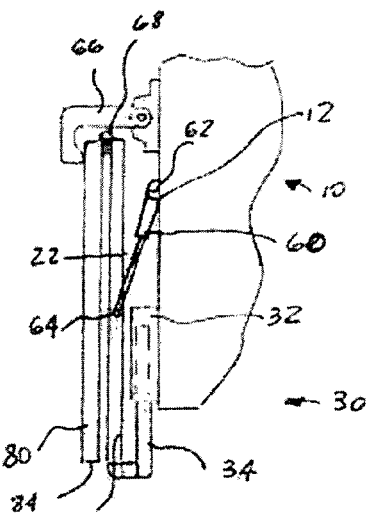
FIG. 2 is a partial elevation view of the retractable patio assembly of FIG. 1, particularly showing such retractable patio assembly in a stored position.
Figure 4:
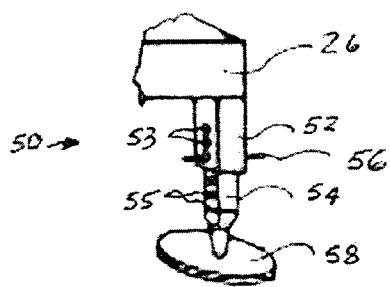
FIG. 4 is a partial perspective view of the retractable patio assembly of FIG. 1, particularly showing the front edge support means.

Reference is now made, to FIGS. 1 and 2, wherein there is shown a recreational vehicle, generally designated 10, having ground engaging wheels and having a wall structure 12 with an access door 14 and an under structure 16.

A retractable patio assembly of the present invention, generally designated 20, comprises a platform means 22 having a predetermined size and having a top surface 24, a front edge 26, a rear edge 28 and a pair of parallel side edges 29.

The material of such platform means may be a metal or a rigid polymer. The preferred material of the platform means 22 is aluminum.

Depending on specific application requirements, such platform means 22 may be formed as a unitary member or the top surface 24 may be attached to a separate frame assembly (not shown) forming such front edge 26, such rear edge 28 and such pair of parallel side edges 29.

In a first embodiment of the present invention, best shown in FIGS. 1-6, there is a mounting means, generally designated 30, engageable with a predetermined portion of the wall structure 12 and a predetermined portion of the platform means 22 enabling selective pivoting thereof between a substantially vertical position adjacent the wall structure 12 and a substantially horizontal position for use adjacent a ground surface and further enabling substantially linear movement of the rear edge 26 in a vertical direction for positioning thereof at a preselected distance from the ground surface.

Figure 3:
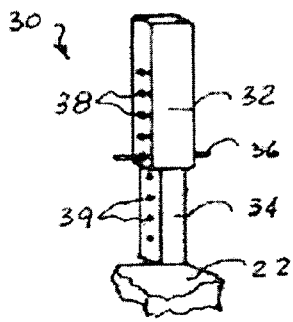
FIG. 3 is a partial perspective view of the retractable patio assembly of FIG. 1, particularly showing the rear edge mounting and adjustment means of the presently preferred embodiment.

In a presently preferred embodiment, best shown in FIGS. 1 and 3, such mounting means 30 includes a pair of laterally spaced first elongated members 32 each rigidly and vertically attached to the wall structure 12 and a pair of second elongated members 34 each pivotally connected to the platform means 22 adjacent each end of the rear edge 28 and movably engageable with a respective one of a pair of first elongated members 32. The preferred shape of such first elongated member 32 and such second elongated member 34 is a rectangular or round tube.

Each second elongated member 34 is adjustably secured to each first elongated member 32 with any conventional locking means, such as first locking pin member 36 engaging apertures 38 disposed within such first elongated member 32 and complimentarily aligned apertures 40 disposed within the second elongated member 34.

Those skilled in the art will readily understand that such mounting means 30 will provide for leveling of the rear edge 28 with respect to the ground surface even in conditions when such ground surface is inclined and will enable reduction of the vertical distance between the ground surface and the platform means 22.

Alternatively, the first locking pin member 36 may directly engage the side edge 29 of the platform means 22 for adjustably and pivotally securing it to each first elongated member 32.

Figure 5:
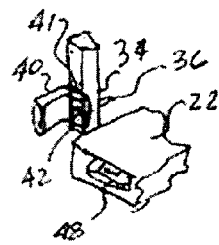
FIG. 5 is partial perspective view of the retractable patio assembly of FIG. 1, particularly showing the rear edge mounting and adjustment means of a first alternative embodiment.

Alternatively, as best shown in FIG. 5, the second elongated member 34 may be adjustably secured to a simple bracket means 40 rigidly attached to the wall structure 12 and having an outwardly extending flange 41 with an aperture 42 for receiving the first locking pin member 36.

Figure 6:
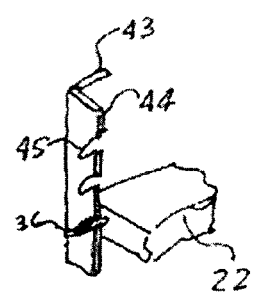
FIG. 6 is partial perspective view of the retractable patio assembly of FIG. 1, particularly showing the rear edge mounting and adjustment means of a second alternative embodiment.

In another alternative embodiment, best seen in FIG. 6, mounting means 30 may include a pair of members 43 each rigidly attached to the wall structure 12 and having an outwardly extending vertical flange 44 with a predetermined plurality of slots 45 for pivotally receiving a pin member 36 which is either rigidly or removably connected to the platform means 22.

Figure 7:
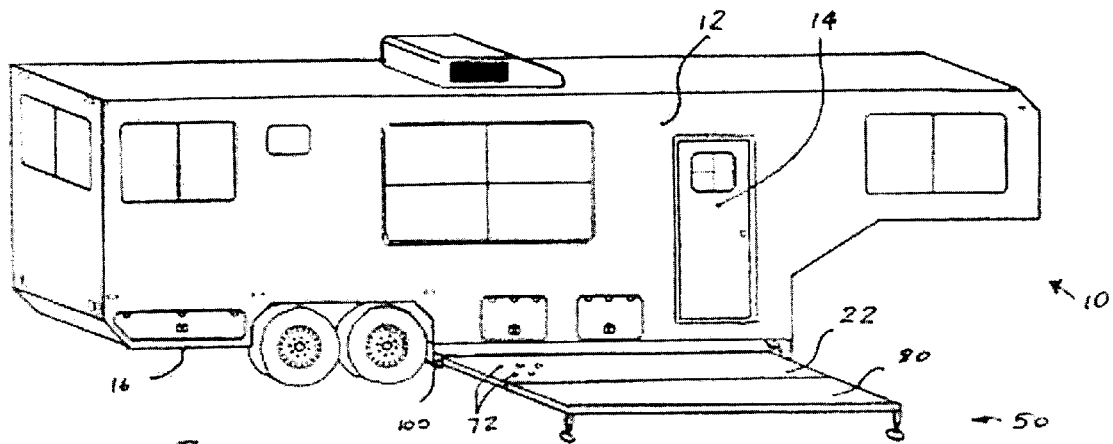
FIG. 7 is a perspective view of a retractable patio assembly constructed according to a second embodiment of the present invention, particularly showing such retractable patio assembly in an extended position.
Figure 8:
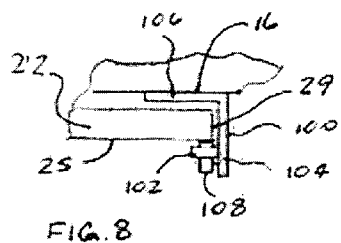
FIG. 8 is a partial front elevation view of the retractable patio assembly of FIG. 7, particularly showing a track member of the present invention.
Figure 9:
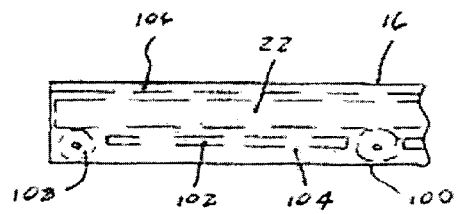
FIG. 9 is a partial side elevation view of the retractable patio assembly of FIG. 8.

In further reference to FIGS. 1, 3 and 7, the platform means 22 is provided with a pair of adjustable support means, generally designated 50, each, in a preferred embodiment, includes a hollow elongated member 52 pivotally connected to a bottom surface of the platform means 22 adjacent each end of the front edge 26 for slideably receiving an elongated member 54.

Each elongated member 54 is adjustably secured to each elongated member 52 with any conventional means, such as a second locking pin member 56 engaging complimentarily aligned apertures 53 and 55. The preferred shape of such elongated members 52 and 54 is a rectangular or round tube.

The elongated member 54 has a ground engaging pad or foot 58 pivotally attached thereto for distributing the weight of the patio assembly over a larger ground surface area and compensating for uneven ground surfaces.

Each support means 50 is pivotable between a first position wherein each support means 50 is outwardly extended from the platform means 22 for engagement with the ground surface and a second position wherein each support means 50 is disposed along a bottom surface 25 of the platform means 22.

To aid in leveling the platform means 22 a well known bubble-type level 48, shown in FIG. 5, may be attached to at least one of the front edge 26, rear edge 28 and side edges 29.

In operation, the platform means 22 is pivotable between a vertical position generally coplanar with the wall structure 12 of recreational vehicle 10. Such position is associated with a stored condition of patio assembly 20 and a horizontal position in which patio assembly 20 is disposed for use by occupants of such recreational vehicle 10 being in a parked condition.

In applications requiring unobstructed use of the access door 14 during transport, a rod 46, best shown in FIG. 1, is rigidly connected to such pair of second elongated members 34. The platform means 22 is than pivotally connected to such rod 46 adjacent the rear edge 28 enabling lateral shift and pivotal movement of such platform means 22 about the rod 46.

In operation, the platform means 22 is laterally shiftable between a first position adjacent the access door 14 and a second position at least partially disposed in front of the access door 14. The platform means 22 is further pivotable about the rod 46 between a substantially vertical position adjacent the wall structure 12 and a substantially horizontal position for use adjacent a ground surface.

Further reference is made to FIGS. 1 and 2, wherein the retractable patio assembly 20 may be provided with a means 60 to assist in manual pivoting of platform means 22 between the vertical and horizontal positions. In the presently preferred embodiment, such means 60 is at least one and, preferably, a pair of well known gas springs 60, each having a first end 62 pivotally connected to the wall structure 12 and a second end 64 pivotally connected to a respective one of the side edges 29.

Alternatively, such means 60 may be a pair of hydraulic or air cylinders (not shown) or any other powered devices capable of pivoting the platform means 22.

Now in reference to FIG. 2, there is at least one locking means 66 having a first portion attached to wall structure 12 and a second portion removably engageable with the platform means 22 for securing it in the vertical position alongside the wall structure 12 during transport. Such at least one locking means 66 can be any well known locking device used for securing retractable patio 20 to the recreational vehicle 10 including but not limited to a latch, hook, safety strap and the like.

The platform means 22 may be provided with means 70 engaging at least a portion of the top surface 24 for providing a positive traction during use. Such traction means 70 may be a well known Safety-Walk™ material manufactured by Minnesota Mining and Manufacturing Company, St. Paul, Minn. and having a friction producing matter applied to one side and a pressure-sensitive adhesive applied to a reverse side for attachment to top surface 24.

Alternatively, such means 70 may be at least one and preferably, a predetermined plurality of apertures 72 disposed within the top surface 24 in a predetermined pattern or such means 70 may be provided by the top surface 24 manufactured from an expended metal or rigid plastic grating.

A coating 76 of a predetermined color may be applied to at least a predetermined portion of such retractable patio assembly 20 for providing protection from environmental factors and enhancing visual appeal. Such coating 76 may be a reflective coating for ease of identification of such retractable patio assembly 20 at night, with an aid of moonlight or with the use of a flashlight. Such reflective coating 76 may be a reflective tape (not shown).

The retractable patio assembly 20 may be additionally provided with a second platform means 80, best shown in FIGS. 1, 2 and 7, having a rear edge 82 which may be pivotally attached to the front edge of the platform means 22 with a well known hinge 68 as best shown in FIG. 2. When stored, such second platform means 80 will be pivoted either over or under the platform means 22.

It will be understood that the support means 50 will be relocated for disposition at a front edge 84 of such second platform means 80 or, to provide additional support, the retractable patio assembly 20 will be provided with a second pair of such support means 50.

Advantageously, the second platform means 80 may be allowed to pivot until the front edge 84 engages the ground surface thus forming a ramp to facilitate use of such retractable patio assembly 20 by disabled or handicap people.

Alternatively, an independent ramp member (not shown) may be provided for removable or pivotal attachment to the front edge 84 of the second platform means 80 or to the front edge 26 of the first platform means 22.

Figure 10:
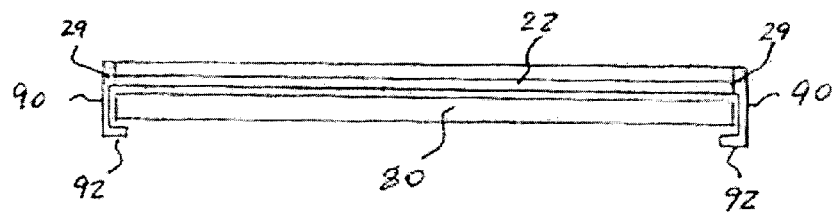
FIG. 10 is a partial front elevation view of the retractable patio assembly of FIG. 7, particularly showing attachment of a second platform means.

In particular reference to FIG. 10, there is shown an alternative coupling of the second platform means 80 to the first platform means 22. In such alternative embodiment, each side edge 29 of the first platform means 22 is provided with a vertical flange 90 extending past the bottom surface 25 and which is terminated with a substantially horizontal flange 92 for slideably receiving the second platform means 80. Such second platform member 80 is movable between a first stored position under the first platform means 22 into a second extended position wherein the rear edge 82 of the second platform means 80 is disposed adjacent the front edge 26 of the first platform means 22.

Now, in reference to FIGS. 7-10, the patio assembly 20 of a second embodiment is slideably disposed adjacent the under structure 16 of the recreational vehicle 10.

In such embodiment, the under structure 16 is adapted with a pair of elongated track means 100, mounted in parallel spaced relationship, for engaging at least opposed side edges 29 of the platform means 22. Each track means 100 has a horizontally disposed flange portion 102 and a vertically disposed wall portion 104. Additionally, a second flange portion 106, best shown in FIG. 8, may be provided for attachment to such under structure 16.

Such pair of elongated track means 100 enables movement of the platform means 22 between a stored position wherein the platform means 22 is disposed substantially under the under structure 16 and an extended position wherein the platform means 22 is at least partially extended past wall structure 12.

Each elongated track member 100 is provided with means 108 for reducing frictional forces during movement of the patio assembly 20 thus requiring reduced force to extend or retract it. In the presently preferred embodiment, such friction reducing means 108 is at least one well known roller 108 rotatably attached to the vertically disposed wall portion 104 adjacent wall structure 12 and engaging bottom surface 25 of the platform means 22. Disposition of such roller 108 adjacent wall structure 12 enables engagement of the roller 108 with the platform means 22 during movement thereof between retracted and extended positions.

Advantageously, predetermined portions of the top surface 24 and the bottom surface 25 disposed adjacent each side edge 29 of the platform means 22 will be caged between the flange portion 102 and one of the second flange portion 106 or under structure 16 thus preventing undesired and unexpected vertical displacement of the platform means 22 when such at least one roller 108 detaches from wall portion 104.

Alternatively, such friction reducing means 108 may be a polymer (not shown) including but not limited to Nylon, Teflon, and Delrin, having a low coefficient of friction and which is attached to a predetermined portion of each of the elongated track means 100.

Alternatively, such polymer (not shown) may be applied as a coating to such pair of elongated track means 100.

In yet another, alternative embodiment, such polymer (not shown) may be applied to the predetermined portion of at least the platform means 22.

It will be appreciated that such friction reducing means 108 may be applied to one of the flange 90, flange 92 and a combination thereof of FIG. 10 for reducing frictional forces during movement of the second platform means 80.

Figure 11:
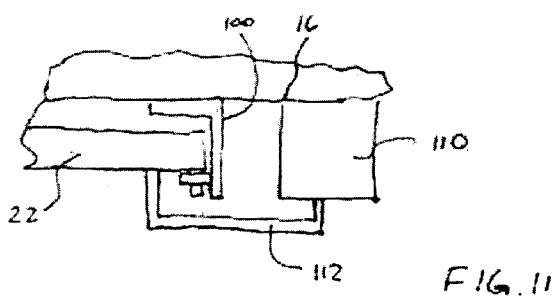
FIG. 11 is a partial front elevation view of the retractable patio assembly of FIG. 7, particularly showing attachment of a powered drive means.

In particular reference to FIG. 11, there is shown a power drive means 100 attached to the under structure 16 of the recreational vehicle 10 and having a connection 112 with at least a platform means 22 for automatically extending and retracting such patio assembly 20. When extended, the patio assembly 20 remains at a predetermined distance above the ground surface. Such power drive means 100 may be any one of a well known electric, pneumatic or hydraulic drive suitable to generate linear motion of the retractable patio assembly 20. For example, such drive means 100 may include an electrically rotatable lead screw (not shown) having a drive nut (not shown) connected to the link 112. Alternatively, such drive means 100 may include a pneumatic cylinder (not shown) having a rod (not shown) connected to the link 112 or a rodless cylinder (not shown) having a connection with the link 112.

Figure 12:
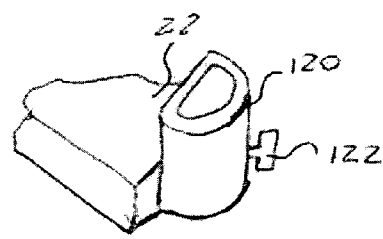
FIG. 12 is a partial perspective of the retractable patio assembly of the present invention, particularly showing means for attachment of a cooking device, such as a grill.

Now, in reference to FIG. 12, there is shown a means 120 having a predetermined shape and engageable with a predetermined portion of the patio assembly 20 for attachment of an upright cooking device (not shown) such as a grill and securing such cooking device (not shown) with at least one lock 122.

Although the present invention has been shown in terms of the patio assembly in combination with a recreational vehicle having ground engaging wheels such as a motor home, mobile home, fifth wheel RV and the like, it will be apparent to those skilled in the art, that the present invention may be applied to a pick-up truck or stationary mounted campers as well.

Furthermore, the patio assembly may be provided with a collapsible or detachable banister or side railing sections well known in the art.

The patio assembly may be further adapted with a well known collapsible or detachable steps means.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A retractable patio assembly for a recreational vehicle having a wall structure with an access door and an under structure, said retractable patio assembly comprising:
   (a) a pair of substantially parallel and laterally spaced elongated tracks rigidly attached to said under structure, each track having a horizontally disposed flange portion and a vertically disposed wall portion;
   (b) a platform having each of a predetermined size and a predetermined shape, a top surface, a front edge, an opposed rear edge and a pair of substantially parallel side edges joining respectively opposed ends of said front edge and said rear edge, each of said pair of side edges engaging a respective one of said pair of said elongated track means for enabling movement of said platform between a stored position wherein said platform is disposed substantially under said under structure and an extended position wherein said platform is at least partially extended past said wall structure; and
   (c) means attached to one of said flange portion, said wall portion and a combination thereof of each of said pair of said elongated track tracks and engageable with a predetermined portions of said platform for reducing frictional forces during movement of said platform between said stored position and said extended position.

2. The patio assembly, according to claim 1, wherein said patio assembly further includes a pair of support means each pivotally attached to a bottom surface of said platform means adjacent each end of said front edge and pivotally movable between a first position wherein said each support means is outwardly extending from said platform means for engagement with said ground surface and a second position wherein said each support means is disposed along said bottom surface.

3. The patio assembly, according to claim 1, wherein said patio assembly further includes means engageable with said top surface for providing positive traction therewith.

4. The patio assembly, according to claim 1, wherein said friction reducing means is at least one roller attached to said wall portion of each of said pair of said elongated tracks and engaging a bottom surface of said platform adjacent a respective one side edge, wherein a portion of said platform disposed adjacent each side edge is caged between said flange portion of each of said pair of said elongated tracks and said under structure of said recreational vehicle.

5. The patio assembly, according to claim 1, wherein said friction reducing means is at least one polymer means having a low coefficient of friction.

6. The patio assembly, according to claim 1, wherein said patio assembly further includes a power drive means attached to said under structure of said recreational vehicle and having a connection with at least said platform for automatically extending and retracting it, whereby said patio assembly is disposed at a predetermined distance from a ground level in said extended position.

7. The patio assembly, according to claim 1, wherein said patio assembly further includes a second platform and means engageable with said first platform and said second platform for moving said second platform between a first stored position alongside one of said top surface and a bottom surface of said first platform and a second extended position wherein a rear edge of said second platform is disposed adjacent said front edge of said first platform.

8. The patio assembly, according to claim 7, wherein said means for moving said second platform between said first stored position and said second extended position includes at least one hinge means attached to a predetermined portion of said first platform means and attached to a predetermined portion of said second platform means.

9. The patio assembly, according to claim 7, wherein said means for moving said second platform is a pair of track means each extending from a respective one of said side edges of said first platform and engaging a predetermined portion of said second platform means.

\* \* \* \* \*